（12) United States Patent
Altfeder

(10) Patent No.: US 9,088,735 B2
(45) Date of Patent: Jul. 21, 2015

(54) COMPUTER-BASED SYSTEM AND METHOD FOR ADDING VARIABLE SECURITY DATA IN PRINTING OPERATIONS

(71) Applicant: Troy Group, Inc., Costa Mesa, CA (US)

(72) Inventor: David Altfeder, Aberdeen, NC (US)

(73) Assignee: TROY GROUP, INC., Costa Mesa, CA (US)

( * ) Notice: Subject to any disclaimer, the term of this patent is extended or adjusted under 35 U.S.C. 154(b) by 0 days.

(21) Appl. No.: 14/065,891

(22) Filed: Oct. 29, 2013

(65) Prior Publication Data

US 2015/0092248 A1 Apr. 2, 2015

Related U.S. Application Data

(60) Provisional application No. 61/885,356, filed on Oct. 1, 2013.

(51) Int. Cl.
*H04N 1/40* (2006.01)
*H04N 1/32* (2006.01)
*G06T 1/00* (2006.01)

(52) U.S. Cl.
CPC .......... *H04N 1/32229* (2013.01); *G06T 1/0028* (2013.01); *G06T 1/0042* (2013.01); *H04N 1/32331* (2013.01); *H04N 1/32336* (2013.01); *G06T 2201/0062* (2013.01); *G06T 2201/0065* (2013.01); *H04N 2201/3233* (2013.01)

(58) Field of Classification Search
CPC .......... H04N 21/8358; H04N 1/00846; H04N 21/4627; H04N 2201/3226; H04N 2201/3274; H04N 1/32144; H04N 1/32203; H04N 2201/3225; H04N 2201/3233; H04N 2201/3249; H04N 1/00875; H04N 1/32352; H04N 21/4181; H04N 2201/3246; H04N 2201/327; H04N 5/913
USPC ................. 358/1.9, 2.1, 3.28, 1.14–1.15, 468
See application file for complete search history.

(56) References Cited

U.S. PATENT DOCUMENTS

| 5,444,779 | A | * | 8/1995 | Daniele ...................... 399/366 |
| 5,636,292 | A | * | 6/1997 | Rhoads ...................... 382/232 |
| 8,687,242 | B2 | * | 4/2014 | Amagai ...................... 358/3.28 |

FOREIGN PATENT DOCUMENTS

JP 06325226 A * 11/1994

* cited by examiner

*Primary Examiner* — Thomas D Lee
*Assistant Examiner* — Stephen M Brinich

(57) ABSTRACT

A computer-based method and a system for adding and printing variable security data. The system includes a memory, a processor, and a printer. The memory stores received print data. The processor modifies the print data for adding variable security print data and sends the modified print data for printing. The printer receives and prints the modified print data. The variable security data may vary between different printing operations. The processor captures a portion of the stored print data based on data-capturing criteria and modifies the stored print data based on the captured portion of the stored print data. The data-capturing criteria may be user-defined and may include leading tag data, trailing tag data, matching tag data, or combinations thereof for indicating a relative position of the captured data.

14 Claims, 12 Drawing Sheets

LEADING: FROM: TRAILING: TO:

USE WITH... ⟶ 71

☐ BACKGROUND WATERMARK

☐ QR CODE ⟶ 73

☐ PLAIN TEXT ⟶ 75

☑ MICROPRINT ⟶ 77

LEADING TEXT: | MEMO WRITTEN BY: | ⟶ 79

FIG. 12

SUBJECT:
IMPORTANT MEMO [CONFIDENTIAL]
FROM: JOHN DOE
TO: MANAGEMENT TEAM
DATE: JUNE 3, 2013
THIS IS THE TEXT PART OF AN IMPORTANT
MEMO DIRECTED TO THE MANAGEMENT.

MEMO WRITTEN BY: JOHN DOE

COMPUTER-BASED SYSTEM AND METHOD FOR ADDING VARIABLE SECURITY DATA IN PRINTING OPERATIONS

CROSS REFERENCE TO RELATED APPLICATIONS

This application claims the benefit of provisional patent application Ser. No. 61/885,356 filed Oct. 1, 2013 for VARIABLE MICROPRINT SECURITY SYSTEM, which is incorporated in this application as if fully set forth herein.

BACKGROUND OF THE INVENTION

1. Field of the Invention

The present invention relates to methods and systems for adding security or identifying data in printing.

2. Description of Related Art

Various private and government entities have sought to distinguish between original documents and photocopied documents, for example, for detecting photocopied/counterfeited bank checks or prescriptions. A microprint (a very small text) can be added to an original document as a security feature. When the original document is photocopied, the microprint may degrade because the resolution of a photocopier or scanner may be too low for reproducing the microprint. Therefore, upon examination, one can recognize that a document with a degraded microprint is not an original document.

The microprint addition techniques have used the same static text (e.g., "ORIGINAL DOCUMENT") on each printed page. However, static microprints are predictable by nature and therefore vulnerable to counterfeiting. Furthermore, a static microprint on a printed document or page fails to provide any indication upon examination as to whether the microprint belongs to the examined page or document because the same microprint is used for other printed documents or pages. Therefore, there is a need in the art for a computer-based security data printing mechanism that varies the added security data between different printed documents or pages. In addition, there is a need for a computer-based security data printing mechanism that varies the added security data based on the contents or characteristics of a printed document or page, for allowing a document examiner to determine whether the security data is indeed associated with the printed document or page and whether the document has been altered.

SUMMARY OF THE INVENTION

A computer-based method and a system for adding and printing variable security data.

The computer-based system includes a processor for receiving or accessing print data. A memory connected to the processor stores the print data. The processor modifies the print data for adding variable security data based on data security criteria. The added variable security data include a microprint, a plain text, a scannable code, a background watermark, a pantograph (a copy protection background), or combinations thereof. The data security criteria may be entirely user-defined, partly user-defined and partly predetermined, or entirely predetermined. The processor sends the modified print data for printing. A printer connected to the processor prints the modified print data. For example, the printer prints a document page that includes the variable security data. The processor stores the data security criteria as document profile data in the memory for applying the data security criteria to subsequent printing operations.

In one embodiment, the data security criteria include data-capturing criteria for capturing a portion of the print data. The processor modifies the print data for adding variable security data based on the captured portion of the print data. For example, the data-capturing criteria may include leading tag data for indicating a starting position of the captured portion of the print data. The data-capturing criteria may include trailing tag data for indicating an ending position of the captured portion of the print data. The data-capturing criteria may include matching tag data for matching the captured portion of the print data with the matching tag data. The processor captures the portion of the print data based on the leading tag data, the trailing tag data, the matching tag data, or combinations thereof.

For example, the processor captures the name of a document's author stated in the document's text (or in the document's metadata). The processor prints the captured name as a microprint. Considering, for example, a document in which the author's name is altered in the document's text, an examiner of the document can determine that the document has been altered by noticing that the author's name in the document's text does not match the author's name in the microprint.

The processor may capture and print various other types of information associated with the document as variable security data. Upon examination of printed data, one can analyze the variable security data and effectively distinguish between an original document and a photocopied/altered document.

BRIEF DESCRIPTION OF THE DRAWINGS

The exact nature of this invention, as well as the objects and advantages thereof, will become readily apparent upon consideration of the following specification in conjunction with the accompanying drawings in which like reference numerals designate like parts throughout the figures thereof and wherein:

FIG. 12 is an illustration of a display interface for security data generator software that allows entry of security data printing criteria;

FIG. 13 is an illustration of a printed document page that includes variable security data.

DETAILED DESCRIPTION OF THE PREFERRED EMBODIMENTS

Figure 1:
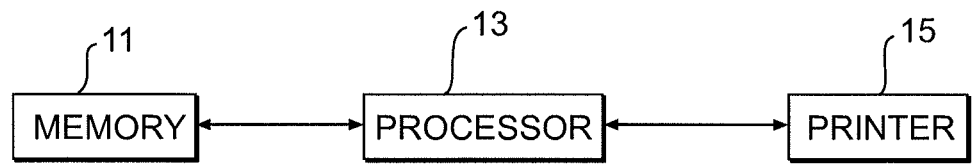
FIG. 1 is a block diagram illustrating hardware components of a computer-based system for adding variable security data in printing operations.

FIG. 1 is a block diagram illustrating components of a computer-based system for adding variable security data in printing operations. The computer-based system includes at least one processor 13 for performing the printing operations. A "processor" as used herein may refer to a single processor or multiple connected processors. The processor 13 is connected to a memory 11 and a printer 15, for example, using a cloud network, a wireless communication link, the Internet, or other connection/communication mechanisms.

The processor 13 receives or accesses print data and may store the print data in the memory 11. The memory 11, as used herein, may be any form of electronic storage media capable of storing data including but not limited to semiconductor-based memory, cloud-based database, and the Internet. The processor 13 modifies the stored print data and sends the modified print data to the printer 15. In one embodiment, the printer 15 is a physical printer (e.g., physical printer 25 shown in FIG. 2) capable of making a representation of the sent print data on physical media. The printer 15 may be a virtual printer capable of making a representation of the sent print data on electronic media, without necessarily leading to making a representation on physical media. For example, the virtual printer may print the print data to an electronic file, for example, a PDF (Portable Document Format) file. In one embodiment, the virtual printer is mapped to a physical printer and prints the sent print data using the physical printer.

The print data, as used herein, may refer to data designated for printing, automatically or upon user selection. The print data may include a print stream. The print stream is a code generated when a user or the processor 13 instructs a software application to print data. In a printing operation, a user may select an electronic file to be printed. As a result, the print stream is sent to a virtual printer mapped to a physical printer. A physical or a virtual printer can use the print stream to print the document.

A printing operation, as used herein, may refer to making a representation of data on physical media (e.g., a printing paper) and/or on electronic media (e.g., an electronic document or file). For example, a printing operation may correspond to a print job or a step for performing a print job (e.g., printing a page as part of a print job). The processor 13 adds variable security data to a document for identification or security of the document. A "document" as used herein may refer to an electronic or a hard copy representation of information. For example, a document may refer to a hard or electronic copy of a prescription.

Upon examination of a printed document that includes variable security data, one can recognize whether the document is an original document or a copied/altered document. The variable security data vary between different printing operations. For example, the processor 13 captures the name of a document's author stated in the document's text. The author name may also be captured from data outside of the document's text, for example, in the document's metadata. The processor 13 prints the captured name as a microprint. Considering, for example, a document in which the author's name is altered in the document's text, an examiner of the document can determine that the document has been altered by noticing that the author's name in the document's text does not match the author's name in the microprint.

Figure 2:
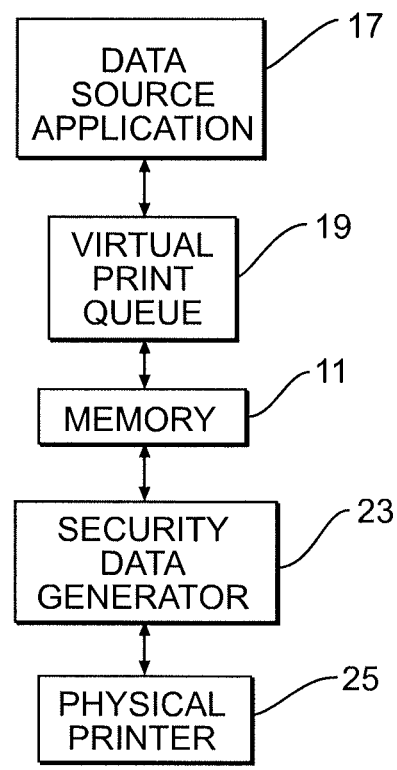
FIG. 2 is a block diagram illustrating hardware and software components of a computer-based system for adding variable security data in printing operations.

Referring now to FIG. 2, a data source application 17 is a type of software for allowing, for example, a user to print an electronic document or a part thereof. In one embodiment, the data source application 17 may automatically print an electronic document without a user request. A virtual print queue 19 is in communication with the data source application 17. The virtual print queue 19 captures the print stream and stores the print stream in the memory 11, for example, as an electronic file. The electronic file may contain a requested print job.

A security data generator 23 is a type of software for analyzing the contents of the stored print job file and performing tasks related to generating variable security data. The security data generator 23 extracts data from the stored print job file based on data security criteria. The data security criteria include criteria for adding and printing variable security data. The data security criteria may be entirely user-defined, partly user-defined and partly predetermined, or entirely predetermined. In an embodiment, the data security criteria may be in part or entirely randomly generated. The variable security data may be a microprint or a plain text. For example, the data security criteria may instruct the processor 13 to capture an author name of a document and print the author name as part of the variable security data. The processor 13 inserts the variable security data in the stored print job file.

The security data generator 23 modifies the stored print job file by adding the variable security data to the stored electronic file. For example, the processor 13 may insert a microprint or a plain text referring to the author name or the document type, as instructed based on the data security criteria. The variable security data may be embedded in a scannable code such as a QR Code® (Quick Response code). For example, the processor 13 may embed information about the print data in a QR code added to the print data. In one embodiment, the processor 13 may embed a plain text referring the name of the document's author in the QR Code. Upon examination of a printed document with a QR code, a QR scanner can be used to read the plain text embedded in the QR code. In one embodiment, the QR Code may contain encrypted data that can be sent to a secure website where authorized users can view the encrypted data.

In one embodiment, the variable security data may be data printed as a background watermark. The background watermark may be printed as a repeated pattern, for example, diagonally across the front or back of a printed page. The background watermark may include the captured text based on the data-capturing criteria. The variable security data may also include a pantograph or a copy protection background. The pantograph consists of a foreground pattern of pixels and a background pattern of pixels. The characters that make up a copy text in a pantograph are printed using the foreground pattern. The combination of the foreground and background patterns create a condition where the copy text is not visible on the printed page yet visible on a copy, thereby allowing one to distinguish between an original document and a copy.

Once the processor 13 modifies the electronic file, the security data generator 23 sends the modified print file to the physical printer 25. The physical printer 25 receives and prints the modified print file that includes the variable security data. In one embodiment, the modified print file may be printed to another software application, for example, for creating a PDF file.

Figure 3:
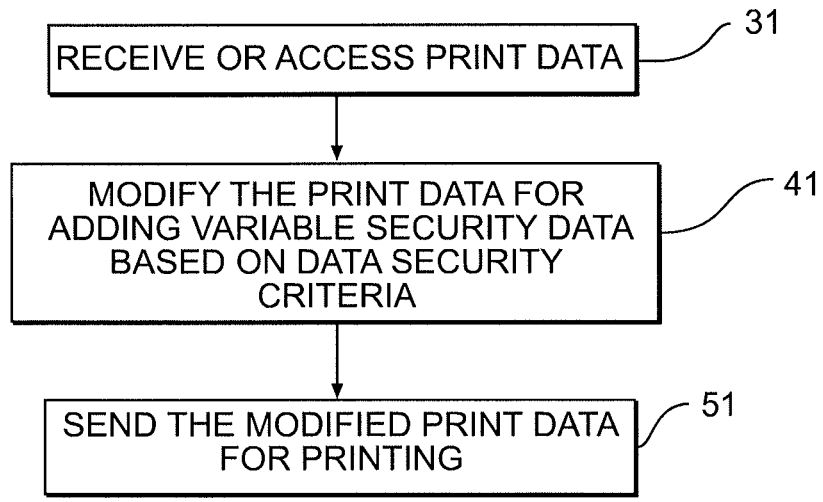
FIG. 3 is a flowchart diagram showing a computer-based method of modifying print data for adding variable security data.

FIG. 3 is a flowchart diagram showing a computer-based method of modifying print data for adding variable security data. In step 31, the processor 13 receives or accesses the print data (for example, the print stream) as discussed above with respect to FIG. 2. In one embodiment, identifier data may be received that allow the security data generator 23 to access the print data. Referring to step 41, the processor 13 modifies the print data for adding variable security data based on data security criteria.

The processor 13 modifies the print stream by adding the variable security data in step 41 and sends the modified print stream for printing in step 51. The printer 15 prints the modified print data or adds the modified print data to a printer queue for future printing.

Figure 4:
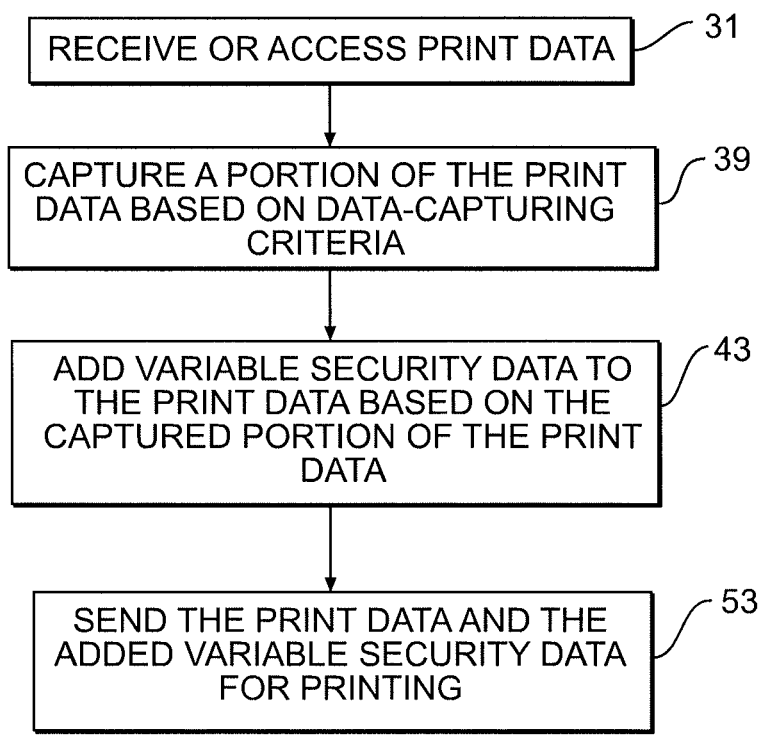
FIG. 4 is a flowchart diagram showing a computer-based method of adding variable security data to print data.

Referring to step 39 of FIG. 4, the processor 13 captures a portion of the print data based on data-capturing criteria. The data-capturing criteria allow the processor 13 to locate and capture data used for generating variable security data. In step 43, the processor 13 adds the variable security data to the print data based on the captured portion of the print data. The captured portion of the print data may be, for example, a document name, an author name, a prescription number, a bank check number or any other content within the print data. In step 53, the processor 13 sends the print data and the added variable security data to a physical printer or a virtual printer for printing.

Figure 5:
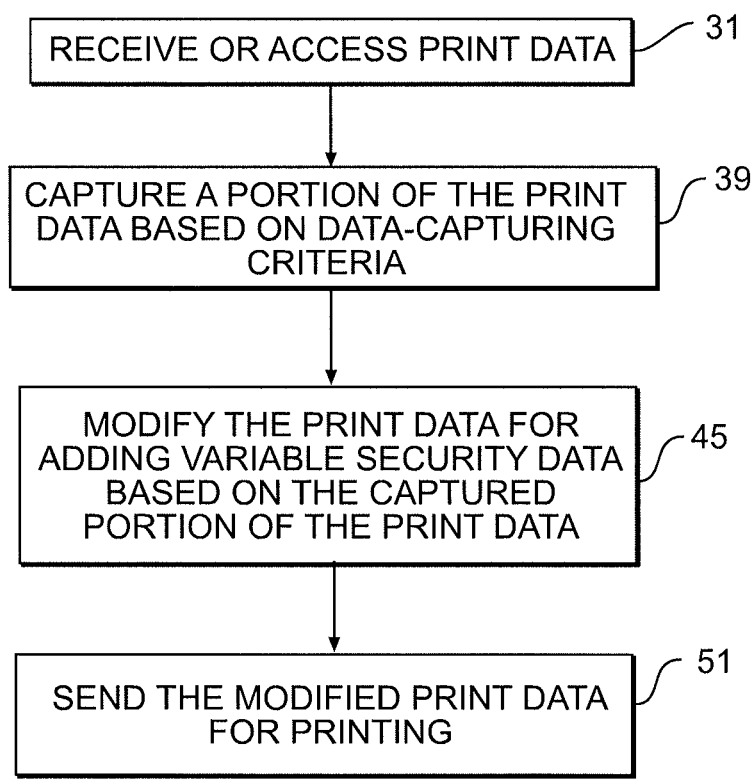
FIG. 5 is a flowchart diagram showing a computer-based method of modifying print data for adding variable security data based on a captured portion of print data.

Referring to FIG. 5, steps 31 and 39 are performed as discussed above with respect to FIG. 4. In step 45, the processor 13 modifies the print data for adding variable security data based on the captured portion of the print data. The processor 13 sends the modified print data to the printer 15 for printing in step 51.

Figure 6:
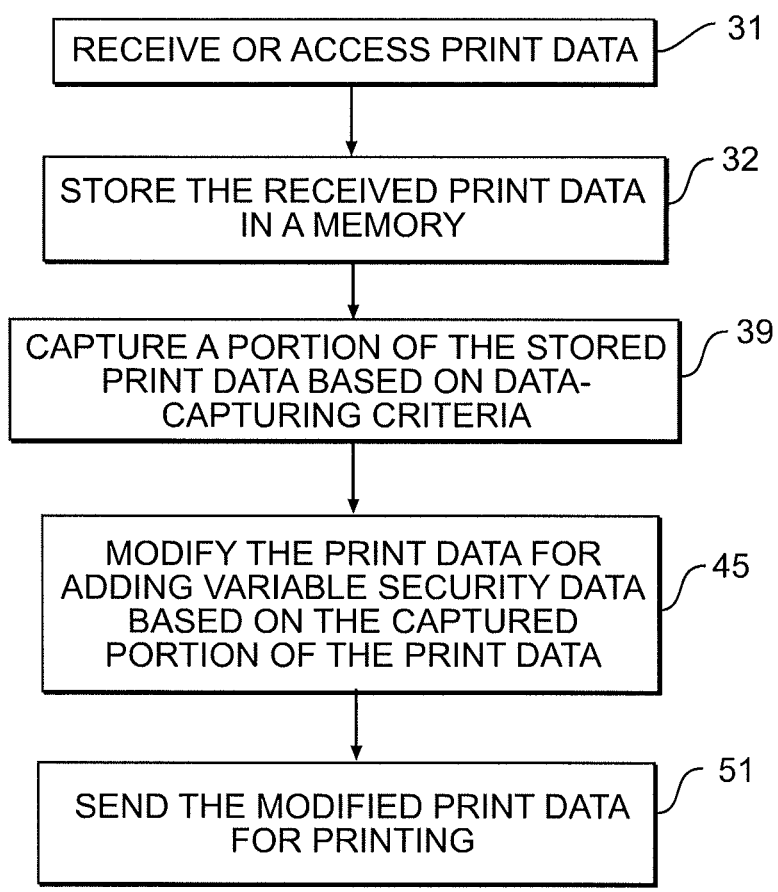
FIG. 6 is a flowchart diagram showing a computer-based method of modifying print data for adding variable security data based on a captured portion of print data.

Referring to step 32 of FIG. 6, the processor 13 permanently or temporarily stores the received or accessed incoming print data in the memory 11, for example, as discussed above with respect to FIG. 2. In step 39, the processor 13 captures a portion of the stored print data based on data-capturing criteria. The processor 13 modifies the stored print data for adding variable security data in step 45 and sends the modified print data for printing in step 51.

Figure 7:
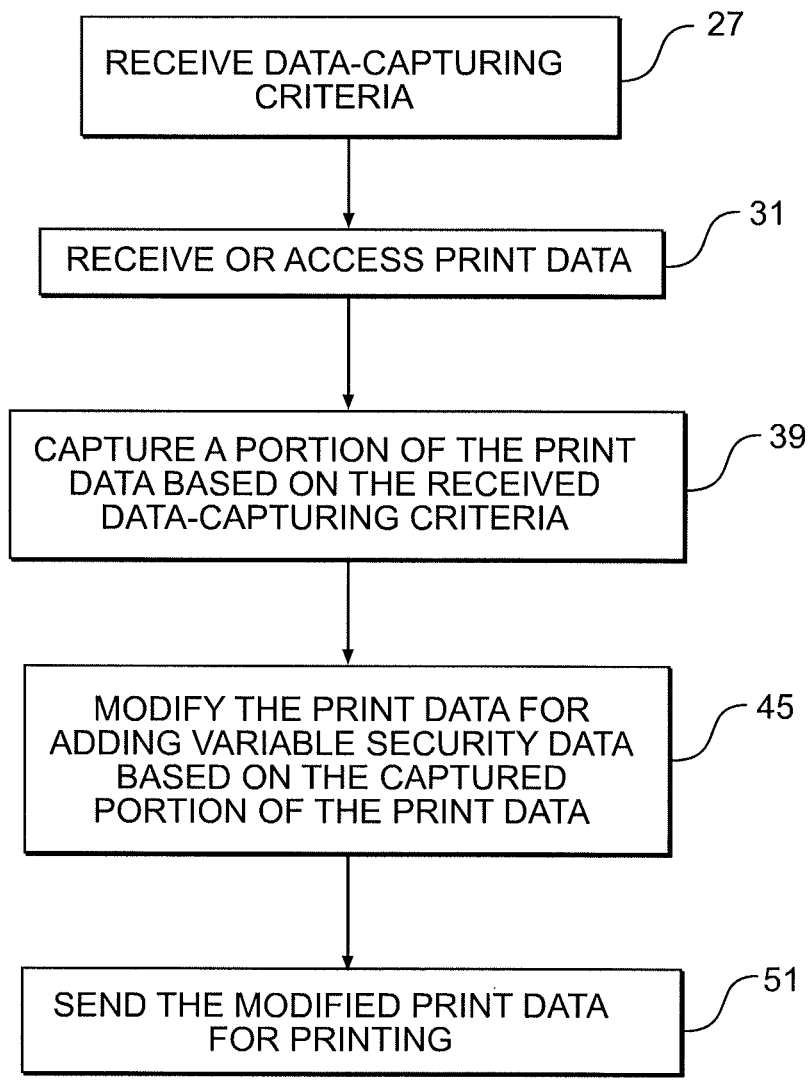
FIG. 7 is a flowchart diagram showing a computer-based method of modifying print data for adding variable security data based on a captured portion of print data.

Referring to step 27 of FIG. 7, the processor 13 receives data-capturing criteria. For example, a user may wholly or in part provide the data-capturing criteria. For example, the user may indicate a preference to include the author name or document name as the added variable security data for certain types of documents. Steps 31, 39, 45 and 51 are performed as discussed above with respect to FIG. 6.

Figure 8:
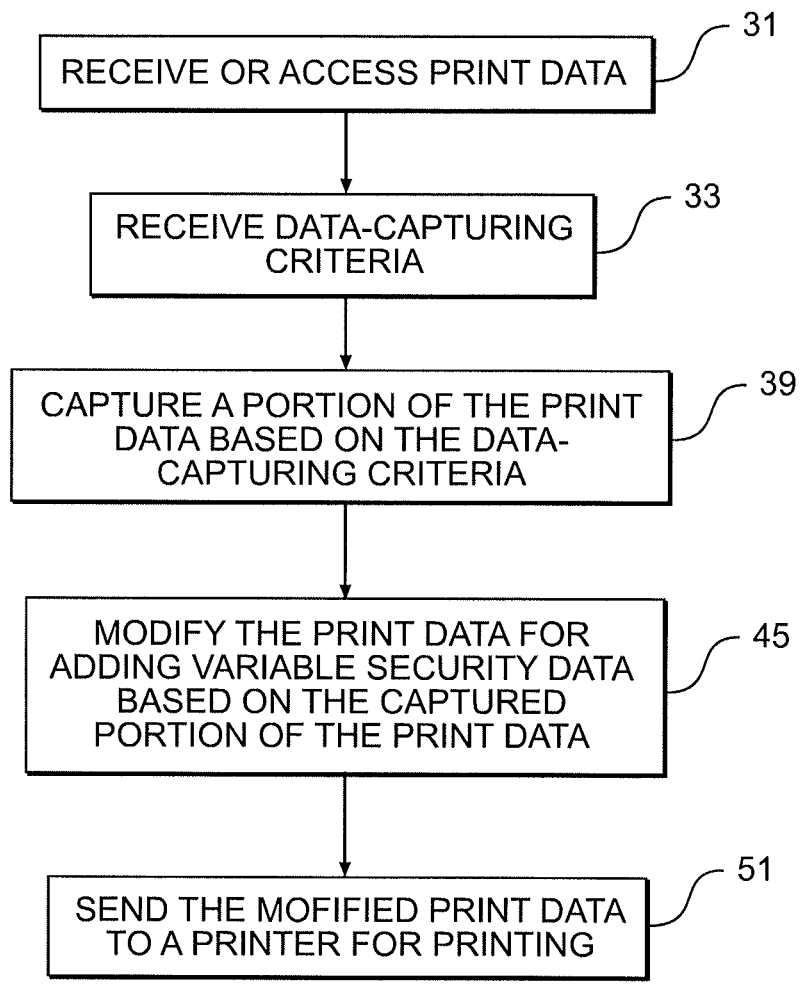
FIG. 8 is a flowchart diagram showing a computer-based method of modifying print data for adding variable security data based on a captured portion of print data.

Referring to step 33 of FIG. 8, the processor 13 may receive the data-capturing criteria after receiving or accessing print data in step 31. For example, a user may designate a document for printing, using the data source application 17, and then input data-capturing criteria for addition of variable data security. Steps 39, 45, and 51 may be performed as discussed above with respect to FIG. 7.

Figure 9:
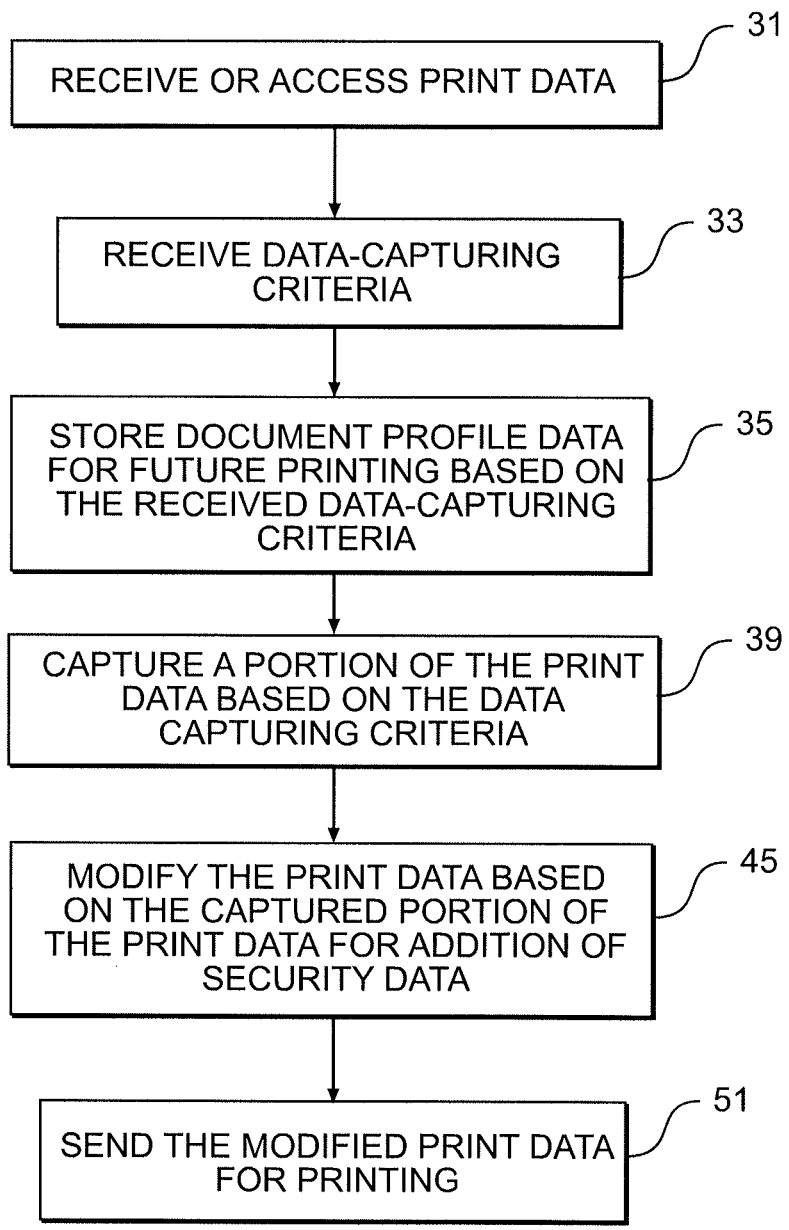
FIG. 9 is a flowchart diagram showing a computer-based method of modifying print data for adding variable security data based on a captured portion of print data.

Referring to step 35 of FIG. 9, the processor 13 may store the data-capturing criteria as document profile data in the memory 11 for future printing and addition of variable security data. In an embodiment, a user may input his/her preference to apply certain data-capturing criteria to a certain type of document. The processor 13 stores the preference as document profile data in the memory 11. In another embodiment, the processor 13 automatically stores a document profile based on the data-capturing criteria.

The processor 13 automatically or upon user confirmation applies the data-capturing criteria to subsequent print jobs related to documents that meet the document profile. In subsequent print jobs, the processor 13 may apply the certain data-capturing criteria upon recognition that a document is of the certain type. The processor 13 applies the certain data-capturing criteria automatically or upon user confirmation. In one embodiment, the user may selectively apply the stored data-capturing criteria to subsequent printing jobs, without requiring re-entry of the data-capturing criteria. The user may edit the stored data-capturing criteria for the pending or subsequent printing jobs.

For example, the user may seek to apply certain variable security data to confidential documents. The user recognizes that confidential documents include the word "CONFIDENTIAL" in the text. The user may create a document profile and input "CONFIDENTIAL" as document profile matching criteria. The processor 13 recognizes that documents in future print jobs that contain the word "CONFIDENTIAL" meet the document profile matching criteria. The processor 13 intercepts future print jobs that contain the word "CONFIDENTIAL" because the print jobs meet the stored document profile matching criteria. The processor 13 applies the corresponding variable security data to the documents in the intercepted print jobs, automatically or upon user confirmation. The processor 13 modifies the print jobs accordingly and sends the modified print jobs for printing.

Figure 10:
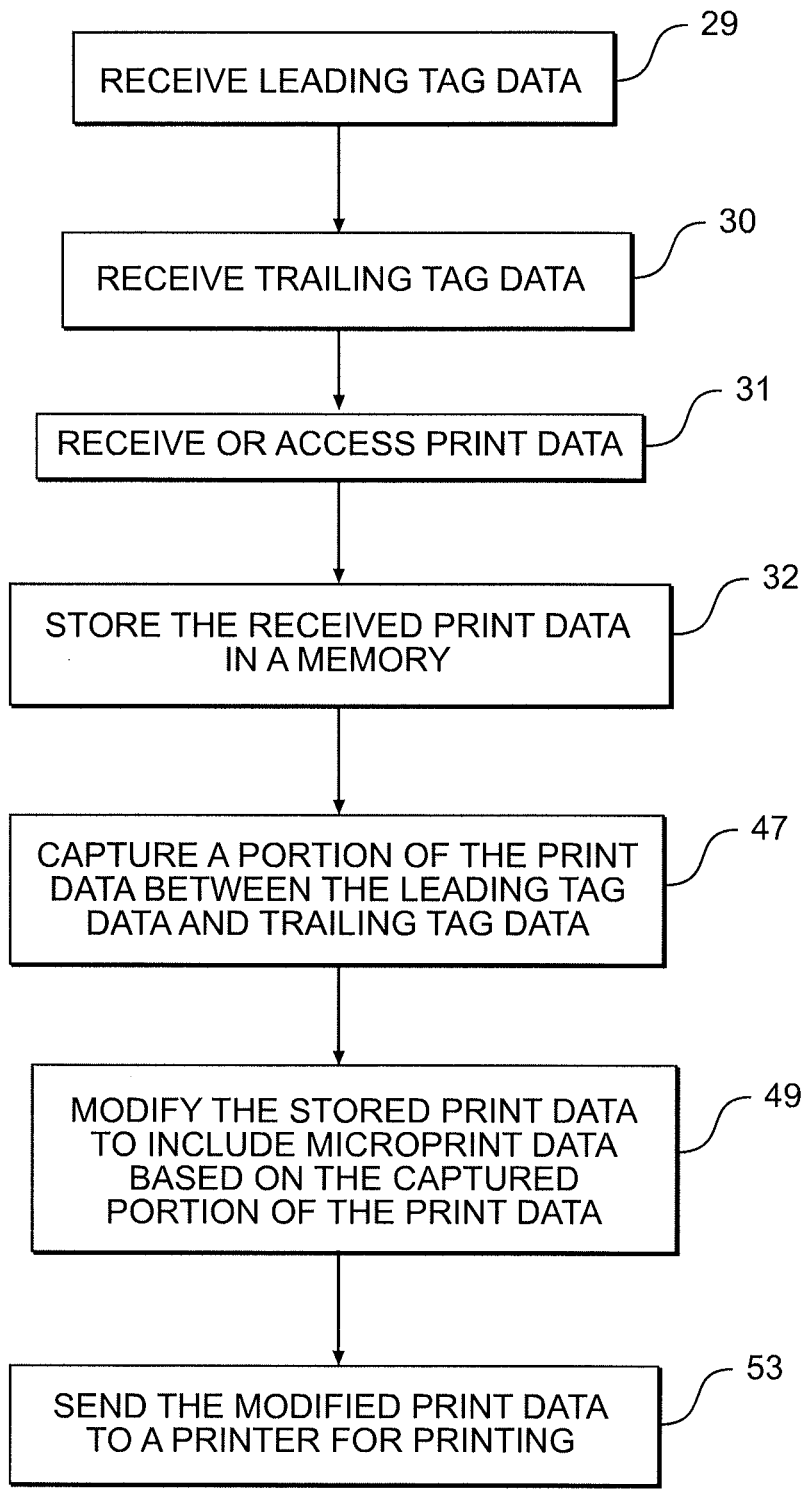
FIG. 10 is a flowchart diagram showing a computer-based method of modifying print data for adding variable security data using leading tag data and trailing tag data.
Figure 11:
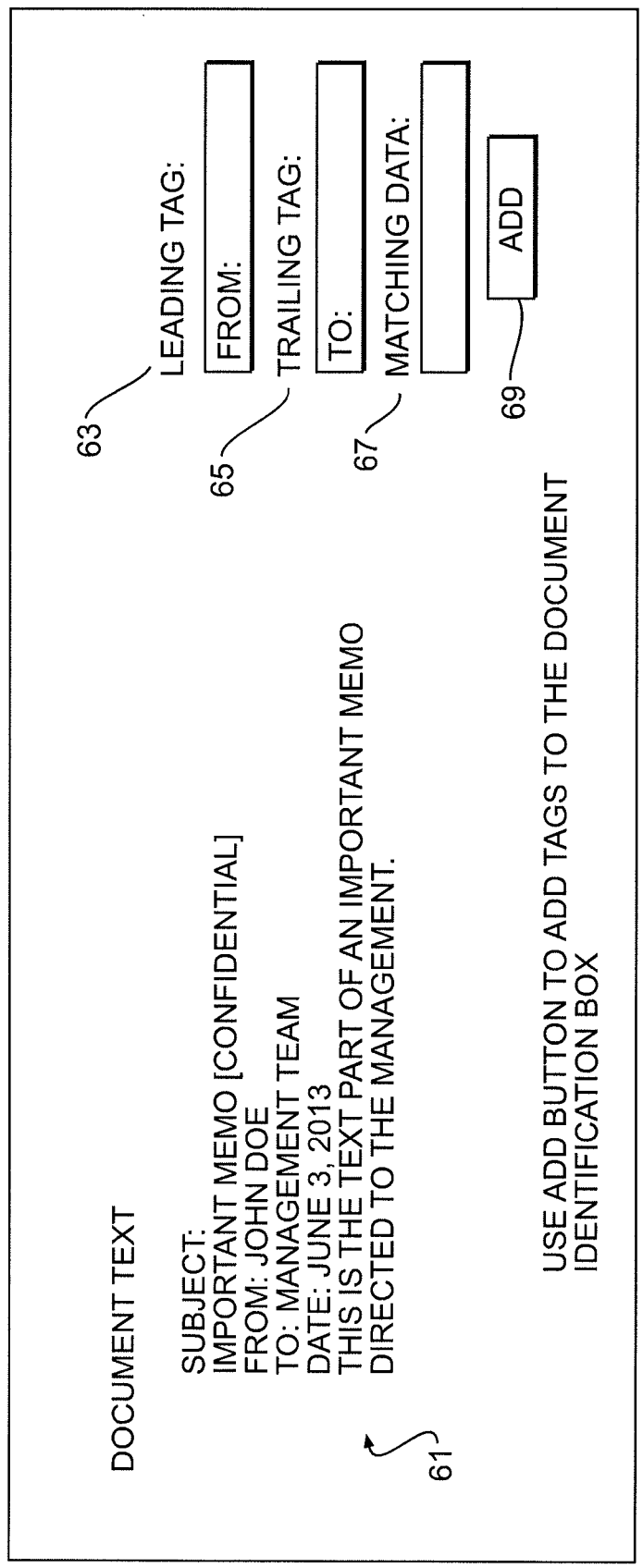
FIG. 11 is an illustration of a display interface for security data generator software that allows entry of data-capturing criteria.

FIG. 10 is a flowchart diagram showing a computer-based method of modifying print data for adding variable security data using leading tag data and trailing tag data. In step 29, the processor 13 receives leading tag data for indicating a starting position of the captured portion of the print data. FIG. 11 is an illustration of a display interface for security data generator software. A user may enter the leading tag data in a leading tag input field 63. For example, a user may recognize that a document author name appears after the text "From:" in certain types of documents such as memorandums (memos) and emails. The user may enter "Form:" in the leading tag input field 63.

Referring to step 30 of FIG. 10, the processor 13 may further receive trailing tag data for indicating an ending position of the captured portion of the print data. Referring to FIG. 11, a user may input "To:" in the trailing tag input field 65, recognizing that author name appears before "To:". The display further shows a document's text 61 that the user seeks to print. The user selects the add option 69 to enter the leading and trailing tag data.

FIG. 12 is an illustration of a display interface for security data generator software that allows entry of security data printing criteria. For example, a user may include a background watermark based on the captured portion of the print data by selecting the background watermark option 71 (e.g., a check box). Similarly, the user may add a QR code, a plain text, and/or a microprint based on the captured portion of the print data using the QR code option 73, the plain text option 75, and/or the microprint option 77, respectively. As discussed above, the software may provide other options for including other types of variable security data. In the embodiment shown in FIG. 12, a user has chosen to print only the microprint option 77. The printed variable security can be inspected to determine whether the printed document has been altered.

In addition, the user may add static security data to the variable security data. For example, the user may choose to add a leading text before the added variable security data using the leading text input field 79. For example, the user may enter "Memo Written By:" to precede the author name in the printed microprint.

Referring to step 31 of FIG. 10, the processor 13 receives or accesses the print data. In step 32, the processor 13 stores the print data in the memory 11. In step 47, the processor 13 captures a portion of the document's text 61 between the leading tag and the trailing tag. Referring to FIG. 11, the processor 13 may capture "John Doe" as it appears between the leading tag ("From:") and the trailing tag ("To"). Referring to step 49 of FIG. 10, the processor 13 modifies the stored print data to include microprint data based on the captured portion of the print data. Referring to step 53 of FIG. 10, the processor 13 sends the modified print data to the printer 15 for printing. It can be appreciated that the steps of flowcharts shown in FIGS. 2-10 may be performed in any other order without limiting the scope of the present invention.

FIG. 13 is an illustration of a document page with variable security data that is printed using the method described above with respect to FIGS. 10-12. The microprint 83 is added to the document's text 81. For clear illustration, the microprint 83 is not drawn to scale. The microprint 83 may be, for example, a very small text between 0.5 and 0.8 points. A plain text or other font sizes may be utilized. The microprint 83 includes the entered leading text of "Memo Written By:" followed by the captured author name, "John Doe" that resided between the leading tag data and the trailing tag data.

Although FIG. 10 shows a method of capturing data based on leading tag data and trailing tag data, the security data generator software may utilize only one of or a combination of the leading, trailing or matching tag data. Referring to FIG. 11, the user may further provide matching tag data using the matching data input field 67. For example, if the user is interested in including variable security data for documents authored by John Doe, the user may enter "John Doe" in the matching data input field 67. As a result, the processor 13 captures the matching text of "John Doe" if it appears between the leading tag "From:" and the trailing tag "To:" and generates variable security data using "John Doe" as shown in FIG. 13.

Figure 14:
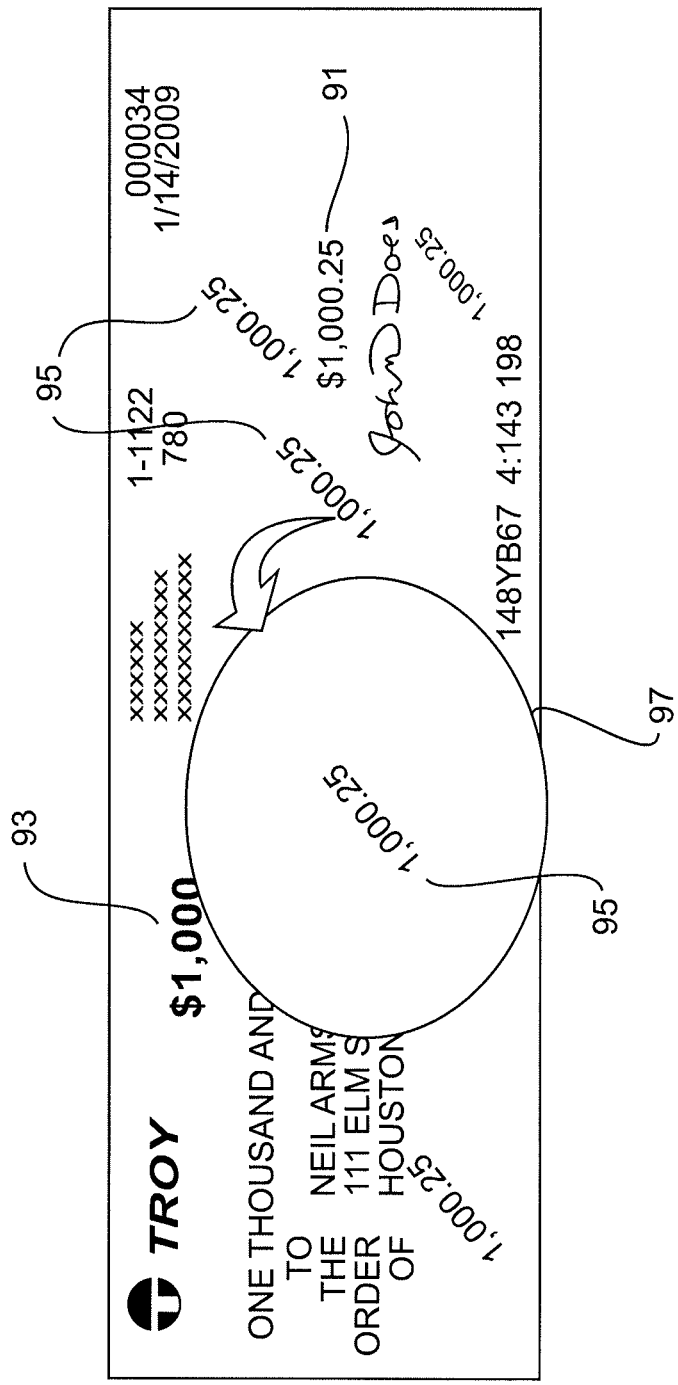
FIG. 14 is an illustration of a printed bank check that includes variable security data.

FIG. 14 is an illustration of a printed bank check that includes variable security data. Using the process discussed above with respect to FIGS. 2-10, the processor 13 captures a dollar amount of the bank check (e.g., 1000.25) and prints the captured dollar amount as a repeated pattern in a watermark background 95. The dollar amount is captured from a first amount field 91 and/or a second amount field 93. The close-up view 97 magnifies the printed watermark background 95 for illustration purposes. As shown in the close-up view 97, the captured amount of 1000.25 is printed in the watermark background 95.

Captured data may be utilized in numerous other printing applications. For example, instead of including static microprint in margins of prescriptions, the process described with respect to FIGS. 2-10 can be used to print a microprint including a patient name, drug description, a number of pills, or a combination thereof. In one embodiment, the information (e.g., prescription number) is printed at least twice, once in the microprint and once in the body of the prescription. Upon examination of the printed prescription, one can verify whether the prescription has been altered by comparing the information in the microprint with the information in the body of the prescription. Therefore, the process described herein prints variable security data for allowing a document's examiner to effectively distinguish between an original document and a photocopied/altered document.

What is claimed is:

1. A non-transitory computer storage medium storing instructions that when executed by a processor, cause the processor to perform a method for adding variable security data, comprising the steps of:
   receiving or accessing print data;
   capturing a portion of the print data based on data-capturing criteria defined by a user;
   modifying the print data for adding the variable security data based on the captured portion of the print data;
   storing document profile data for future printing based on the user-defined data-capturing criteria; and
   sending the modified print data for printing.

2. The non-transitory computer storage medium of claim 1, wherein the data-capturing criteria include leading tag data for indicating a starting position of the captured portion of the print data.

3. The non-transitory computer storage medium of claim 1 wherein the variable security data include a microprint, a scannable code, a background watermark, or a pantograph.

4. The non-transitory computer storage medium of claim 1, wherein the data security criteria include predetermined or randomly generated criteria.

5. The non-transitory computer storage medium of claim 1, wherein the variable security data include a user entry.

6. The non-transitory computer storage medium of claim 1, wherein the step of sending the modified print data includes sending the modified print data to a physical printer.

7. The non-transitory computer storage medium of claim 1, wherein the variable security data include variable microprint data.

8. The non-transitory computer storage medium of claim 1, wherein the data-capturing criteria include leading tag data for indicating a starting position of the captured portion of the print data.

9. The non-transitory computer storage medium of claim 1, wherein the data-capturing criteria include trailing tag data for indicating an ending position of the captured portion of the print data.

10. A non-transitory computer storage medium storing instructions that when executed b a processor, cause the processor to perform a method for adding variable security data, comprising the steps of:
    receiving or accessing print data;
    capturing a portion of the print data based on data-capturing criteria including tag data for matching the captured portion of the print data with the matching tag data;
    modifying the print data for adding the variable security data based on the captured portion of the print data; and
    sending the modified print data for printing.

11. A computer-based system for adding variable security data, the system comprising:
    a memory for storing print data;
    a processor connected to the memory for capturing a portion of the stored print data based on data-capturing criteria defined by a user, for modifying the print data to add the variable security data based on the captured portion of the print data, and for sending the modified print data for printing, the processor configured to store document profile data for future printing in the memory based on user-defined data-capture criteria; and
    a printer connected to the processor for receiving the sent print data.

12. The system of claim 11 wherein the data-capturing criteria include leading tag data for indicating a starting position of the captured portion of the print data and trailing tag data for indicating an ending position of the captured portion of the print data.

13. A computer-based system for adding variable security data, the system comprising:
a memory for storing print data;
a processor connected to the memory for capturing a portion of the stored print data based on data-capturing criteria including matching tag data for matching the captured portion of the print data with the matching tag data, for modifying the print data for printing; and
a printer connected to the processor for receiving the print data.

14. The system of claim 13 wherein the security data includes a microprint, a scannable code, a background watermark, or a pantograph.

* * * * *